United States Patent
Auerbach et al.

[19]

[11] Patent Number: 6,002,343
[45] Date of Patent: Dec. 14, 1999

[54] CHANGING INDICIA IN AN ELECTRONIC TAG WHEN TAMPERED WITH

[75] Inventors: Micha Auerbach, Maccabim; Rony Cohen, Zoran; Vadim Leibman, Migdal Haemek; Arcadi Genin, Bat Yam; Reuven Ilyaev, Tel Aviv, all of Israel

[73] Assignee: Hi-G-Tek Ltd., Or Yehuda, Israel

[21] Appl. No.: 08/815,389

[22] Filed: Mar. 11, 1997

[30] Foreign Application Priority Data

Oct. 28, 1996 [IL] Israel ......................................... 119509

[51] Int. Cl.⁶ ..................................................... H04Q 1/00
[52] U.S. Cl. .............................. 340/825.54; 340/825.34; 340/825.78; 340/664
[58] Field of Search ..................... 340/825.78, 825.34, 340/825.54, 572.1, 572.2, 561, 664

[56] References Cited

U.S. PATENT DOCUMENTS

| | | | |
|---|---|---|---|
| 4,218,674 | 8/1980 | Brosow | 340/825.34 |
| 4,827,395 | 5/1989 | Anders | 340/825.54 |
| 4,952,913 | 8/1990 | Pauley et al. | 340/573 |
| 5,072,213 | 12/1991 | Close | 340/572 |
| 5,097,253 | 3/1992 | Eschbach | 340/545 |
| 5,099,228 | 3/1992 | Israel et al. | 340/572 |
| 5,266,925 | 11/1993 | Uercellotti et al. | 340/572 |
| 5,656,996 | 8/1997 | Houser | 340/568 |

FOREIGN PATENT DOCUMENTS

| | | | |
|---|---|---|---|
| 0513456 | 11/1992 | European Pat. Off. | |
| 07 02 324 | 3/1996 | European Pat. Off. | G06K 17/00 |
| 2256958 | 12/1992 | United Kingdom . | |
| 2276025 | 9/1994 | United Kingdom | G08B 21/00 |
| 2279170 | 12/1994 | United Kingdom | G08B 13/14 |
| WO 90/09648 | 8/1990 | WIPO | G08B 13/24 |
| WO 94/28523 | 12/1994 | WIPO | G08B 13/14 |
| WO 95/14938 | 6/1995 | WIPO | G01S 13/78 |
| WO 95/29456 | 11/1995 | WIPO | G06K 7/08 |
| WO 96/07938 | 3/1996 | WIPO | G01V 15/00 |
| WO 96/16387 | 5/1996 | WIPO | G08G 1/27 |
| WO 96/20463 | 7/1996 | WIPO . | |
| WO 97/38364 | 10/1997 | WIPO . | |

*Primary Examiner*—Brian Zimmerman
*Attorney, Agent, or Firm*—Stephen J. Koundakjian

[57] ABSTRACT

An electronic seal including an electronic tag, an electrically resistive element in electrical communication with and attached to the tag, the resistive element being bondable to an object so as to define an electrical resistance, wherein a change in bonding of the element to the object causes a change in the electrical resistance, the change in electrical resistance being communicated to the tag.

9 Claims, 2 Drawing Sheets

CHANGING INDICIA IN AN ELECTRONIC TAG WHEN TAMPERED WITH

FIELD OF THE INVENTION

The present invention relates to electronic seals generally, and particularly to RF-interrogated identification tags and electronic seals.

BACKGROUND OF THE INVENTION

It is well known to identify objects with tags that can be monitored, sensed or interrogated from a remote location.

There are several types of RF-interrogated identification tags currently on the market. One example is the SMART Pass system developed by AMTECH Corp. of Dallas, Tex. Their system uses passive RF tags, a little larger than a standard credit card and nearly ½ an inch thick. The tags require a large, high-frequency antenna capable of sending a microwave-frequency RF pulse strong enough to energize the tag to the point where it can return its identification number. The maximum range of the AMTECH system is a few meters. The AMTECH system antenna is designed to be mounted on a metal pole. Its size (38.1 cm×41.7 cm×10.2 cm) and power requirements, are prohibitive for use in an office or hospital environment for tracking capital assets. The system does not allow tracking several objects simultaneously.

Other identification tag systems, such as Texas Instrument's TIRIS system, the Dutch NEDAP monitoring system, and the Israeli On-Track Innovations PorTrac system, are all distance limited solutions for remote, contactless, control of tags and objects. The practical reliable communication distance between tag and object is about 10 cm. Larger distances require very strong magnetic fields, utilizing large and costly hardware associated with them.

Currently available active or passive electronic tagging systems either require a large and costly portable monitoring antenna with limited interrogation range (several score centimeters), or a physical connection to the electronic tag.

SUMMARY OF THE INVENTION

The present invention seeks to provide improved, battery operated, active electronic RF tags that can communicate with a small transceiver over distances of up to few score meters. The system of the present invention allows a user to read many tags at the same time, with a lifetime of several years for each tag.

In a preferred embodiment of the present invention, a very low power receiver and a transmitter are integrated on one silicon chip, thereby achieving a significant miniaturization of the tag with a long life time, and at the same time offering a significant reduction in unit price, despite requiring the use of a battery. The use of a backup battery helps overcome the range problem, the high cost of the reader, and the environmental problems associated with the emission of very strong magnetic fields.

The tag includes a resistive element disposed between the tag body and the object enclosure. Any attempt to remove the tag from the object, will cause an irreversible damage/change to the resistor layer between the tag and the object, resulting in an electronic indication/alarm signal.

The electronic tag is a battery operated device and has a unique 64 bits serial number. The tag transmits its data upon receiving a wake up signal from a transceiver. The transceiver can initiate a search signal automatically, in pre-defined time intervals, or upon initiation of a signal from a main network computer. The transceivers can be connected together through any kind of LAN system.

After attaching the tag to an object, any attempt to remove the tag from the object will cause a change in the unique code, i.e., resistance associated with the resistive element of the tag. The tag functions both as an identification tag and as an electronic seal.

The electronic seal of the present invention operates with a battery in a sleeping mode of operation, and activates its receiver circuitry only once about every 1.5 sec for a duration of about 10 ms. The measuring and transmitter circuitry is activated only when a wake-up signal is received from the transceiver. In this way an operating range of up to 30 meters may be achieved with a life time of a few years, depending on the number of interrogations per day. The battery may consume less than 10 microamperes of current during sleeping mode.

The transceiver emits a wake-up signal with a duration of more than 1.5 Sec. to ensure reception of all tags in a given area. The tags respond with a random delay, within the required time interval. The system of the present invention can detect and control up to 50 tags in one location with a search time of 2 sec maximum.

There is thus provided in accordance with a preferred embodiment of the present invention, an electronic seal including, an electronic tag, an electrically resistive element in electrical communication with and attached to the tag, the resistive element being bondable to an object so as to define an electrical resistance, wherein a change in bonding of the element to the object causes a change in the electrical resistance, the change in electrical resistance being communicated to the tag.

In accordance with a preferred embodiment of the present invention, the tag transmits the change in electrical resistance to a transceiver, the transceiver communicating the change to a detection system. Preferably the tag transmits the change to the transmitter by RF transmission.

In accordance with one preferred embodiment of the present invention, the resistive element comprises a resistive ink applied to a flexible material.

In accordance with another preferred embodiment of the present invention, the resistive element comprises a multiplicity of resistive wires, wherein only a random number of the wires are electrically connected to the tag.

Additionally in accordance with a preferred embodiment of the present invention, the resistive element is bonded to the tag with an electrically conductive adhesive having an adhesive strength, the element being bonded to the object with an adhesive strength greater than the adhesive strength of the conductive adhesive.

Further in accordance with a preferred embodiment of the present invention, the tag operates in a sleeping mode and the change in electrical resistance is communicated to the tag only when the tag is activated with a wake-up signal. Preferably a transceiver communicates the wake-up signal to the tag.

In accordance with a preferred embodiment of the present invention, the tag includes a timer and memory for monitoring time and duration of the change in electrical resistance. Preferably the memory stores at least one of identification data and asset data.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
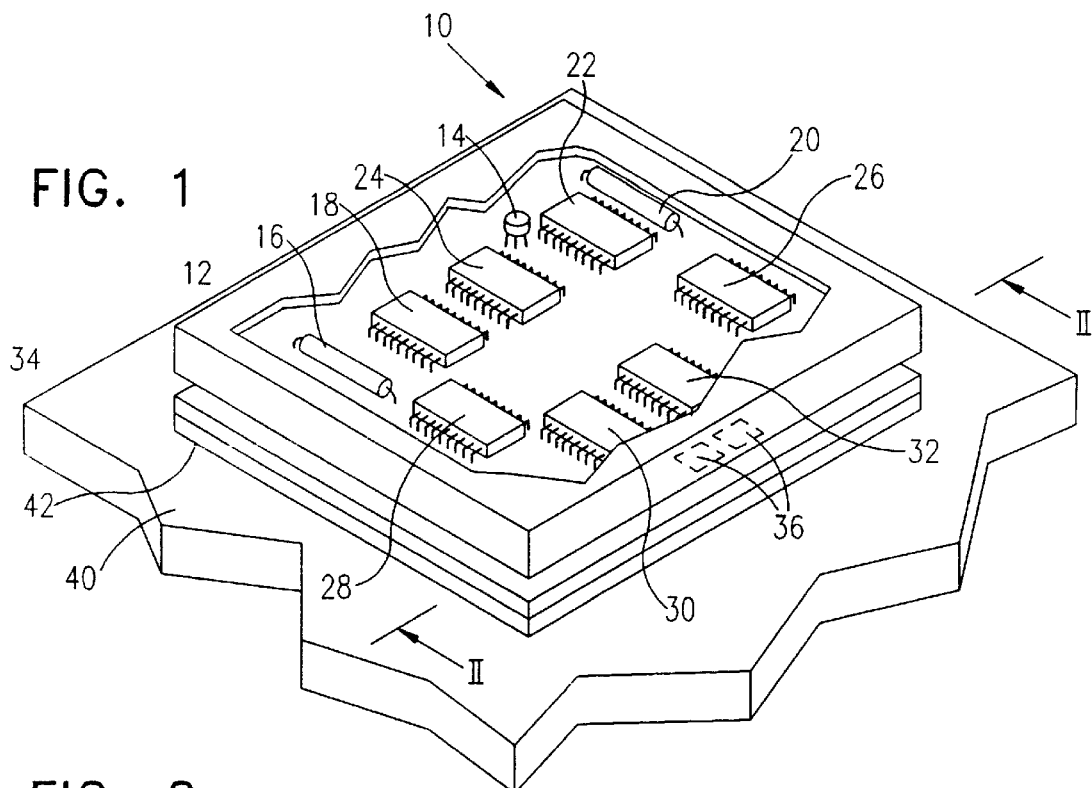
FIG. 1 is a simplified pictorial illustration of an electronic seal, including an electronic tag and an electrically resistive element, constructed and operative in accordance with a preferred embodiment of the present invention.
Figure 2:
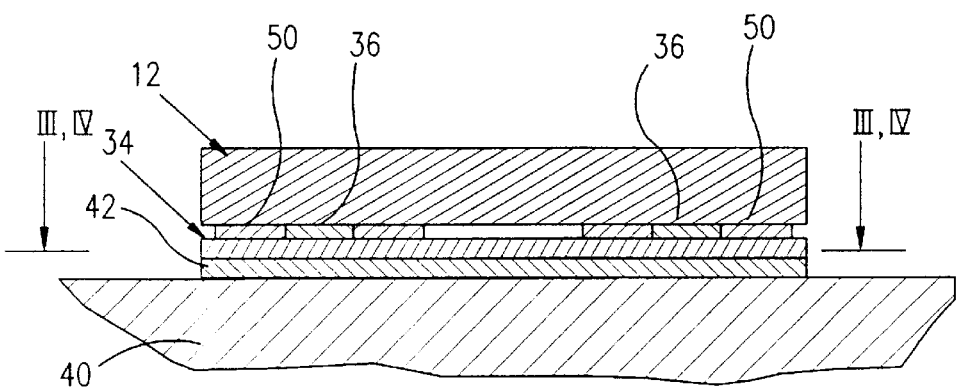
FIG. 2 is a simplified sectional illustration of the electronic seal of FIG. 1, taken along lines II—II in FIG. 1.

Reference is now made to FIGS. 1 and 2 which illustrate an electronic seal 10 constructed and operative in accordance with a preferred embodiment of the present invention.

Electronic seal 10 includes an electronic tag 12 which preferably includes electronics comprising a battery 14, a receiver antenna 16, receiver circuitry 18, a transmitter antenna 20, transmitter circuitry 22, a microprocessor 24, a timer 26, a logic and memory component 28, an analog-to-digital (A/D) converter 30 and a current source 32. The electronics of tag 12 is not limited to the abovementioned components, and may include more or less components, depending upon the application.

The electronics of tag 12 are in electrical communication with an electrically resistive element 34, such as via I/O pads 36. Resistive element 34 is preferably bonded to an object 40 with an adhesive 42 so as to define an electrical resistance. Any change in bonding of element 34 to object 40 causes a change in the electrical resistance. Adhesive 42 may be a double sided adhesive tape or adhesive foam.

Figure 3:
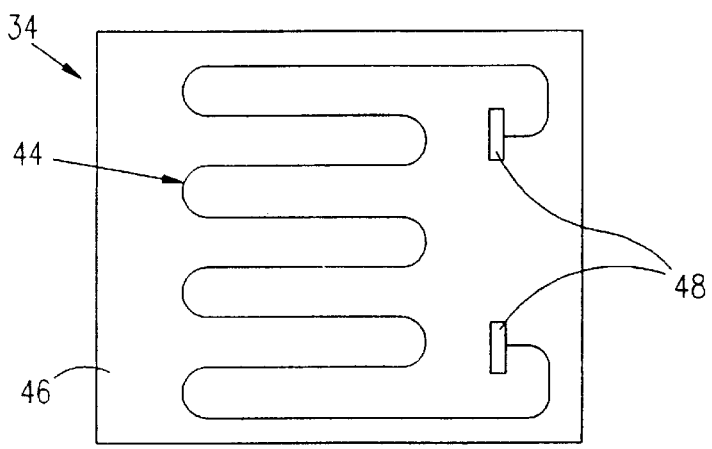
FIG. 3 is a simplified sectional illustration of the resistive element of FIG. 1, taken along lines III—III in FIG. 2.

The resistive element of the present invention may be constructed in a variety of manners. Reference is now made to FIG. 3 which illustrates resistive element 34, constructed and operative in accordance with one embodiment of the present invention. A resistive ink 44, preferably polymer based, is applied to a flexible material 46, such as polyester or polyimide films, e.g., MYLAR or KAPTON. Resistive ink 44 may be applied in a variety of manners, e.g., screen printing, roller coating, dipping, transfer deposition, or any other process that provides a controlled coating. Resistive ink 44 is printed on material 46 in any suitable pattern to provide a desired resistance value which may be adjusted after curing by laser trimming, abrasion or mechanical punching, for example. Preferably I/O pads 48 are connected to the pattern of resistive ink 44, pads 48 being in electrical communication with I/O pads 36 of tag 12.

Resistive element 34 is preferably attached to tag 12 by means of a conductive adhesive 50, such as a metal impregnated adhesive. Preferably the adhesive strength of adhesive 42 is greater than the adhesive strength of conductive adhesive 50, so that removal of tag 12 from object 40 causes shearing or other deformation of conductive adhesive 50, and alters the resistance of resistive element 34. Alteration of the resistance of element 34 may be stored in memory component 28 and/or may be transmitted via transmitter 22 and antenna 20 to a detection system (not shown).

Figure 4:
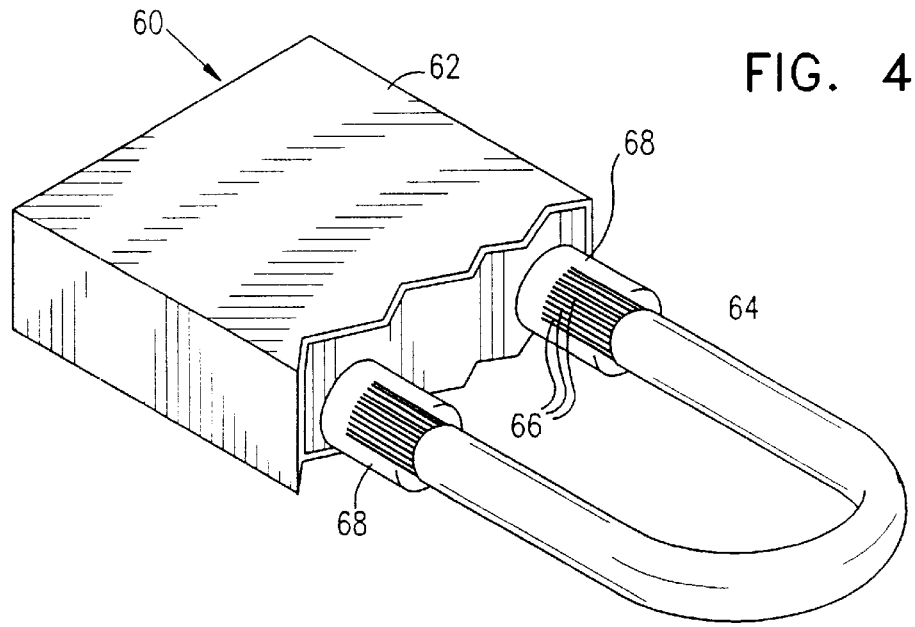
FIG. 4 is a simplified pictorial cutaway illustration of an electronic seal, including an electronic tag and an electrically resistive element, constructed and operative in accordance with another preferred embodiment of the present invention.

Reference is now made to FIG. 4 which illustrates an electronic seal 60, constructed and operative in accordance with another preferred embodiment of the present invention. Electronic seal 60 includes a tag 62 which preferably includes electronics substantially identical to electronics of tag 12 of seal 10. Electronic seal 60 includes a resistive element 64 which comprises a multiplicity of resistive wires 66, preferably constructed of a high resistivity material such as nickel chrome. Each wire 66 is insulated from each other and from the external world. Wires 66 are attached to internal I/O pins 68 of tag 62, such as by crimping or soldering, wherein only a random number of wires 66 are electrically connected to pins 68 and the remainder of wires 66 are not connected to pins 68. The random connection results in a statistically random electrical resistance of resistive element 64, which resistance cannot be measured from the outside of tag 62.

Seal 60 may be potted for added protection from the environment. Seal 60 is preferably attached to an object (not shown) in a manner substantially similar to seal 10, as described hereinabove. Removal of tag 62 from the object causes shearing or other deformation of wires 66, and alters the resistance of resistive element 64. Alteration of the resistance of element 64 may be stored in memory component 28 (not shown in FIG. 4) and/or may be transmitted via transmitter 22 and antenna 20 to a detection system (all not shown in FIG. 4).

Figure 5:
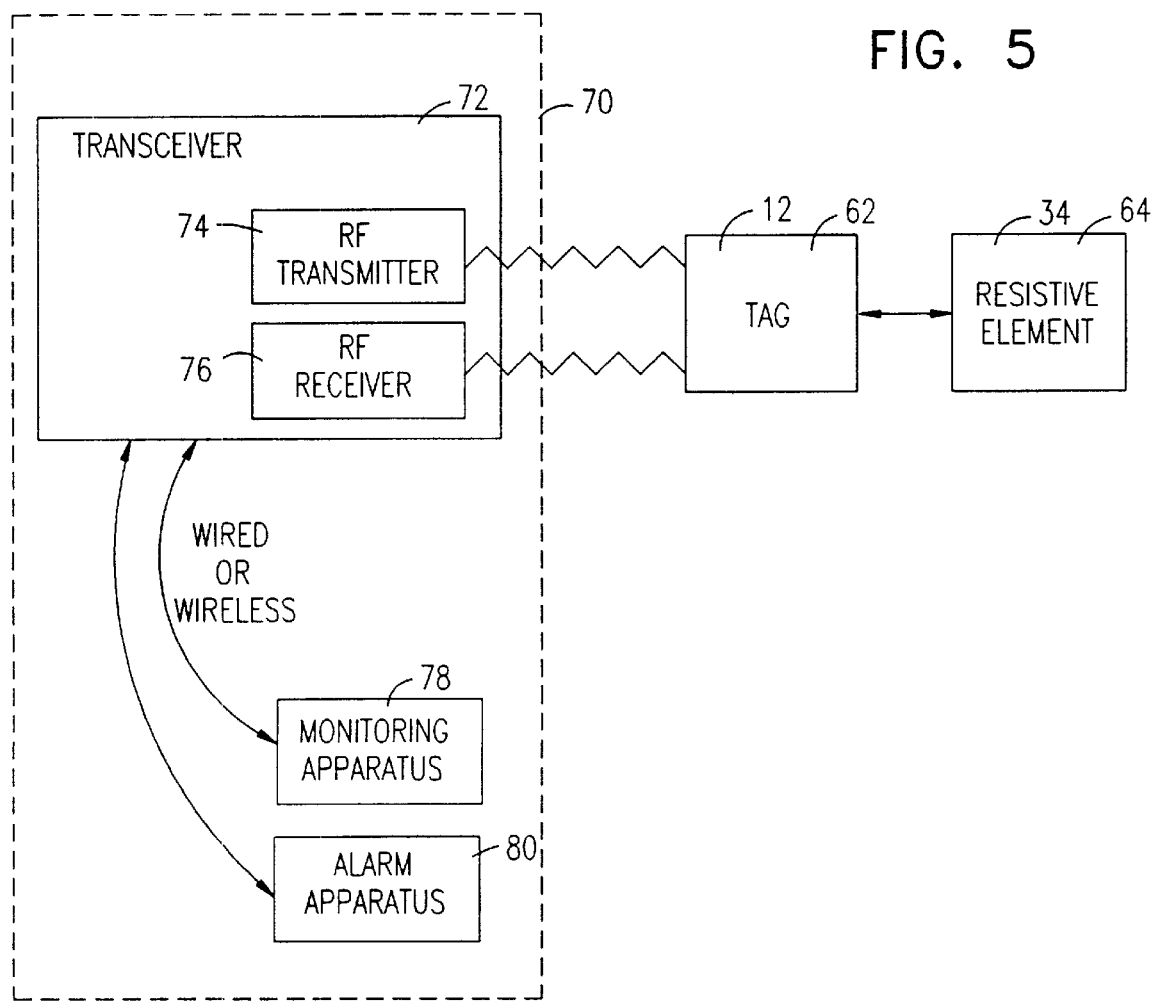
FIG. 5 is a simplified block diagram of the electronic seals of FIGS. 1 and 4 used in a detection system, constructed and operative in accordance with a preferred embodiment of the present invention.

Reference is now made to FIG. 5 which illustrates a simplified block diagram of the electronic seals of FIGS. 1 and 4 used in a detection system 70, constructed and operative in accordance with a preferred embodiment of the present invention.

Detection system 70 preferably includes a transceiver 72 which communicates with either tag 12 or 62 via an RF transmitter 74 and an RF receiver 76. Transceiver 72 preferably also communicates with monitoring apparatus 78 and/or alarm apparatus 80, via wired or wireless communication, such as a LAN.

Preferably tag 12 or 62 operates in a sleeping mode so as to conserve energy of battery 14. Tag 12 or 62 is activated only upon receipt of a wake-up signal from transceiver 72. Once tag 12 or 62 is activated, any change in electrical resistance of resistive element 34 or 64, respectively, is communicated or monitored. For example, the change in resistance may be stored in memory component 28 and/or relayed to transceiver 72 and thence to either monitoring apparatus 78 or alarm apparatus 80. Timer 26 and/or memory component 28 may be used to monitor time and duration of the change in electrical resistance.

Preferably memory component 28 stores at least one of identification data and asset data. Transceiver 72 may interrogate tag 12 or 62 for the identification and/or asset data. The asset data may include a variety of information about the object being monitored, including inventory and sub-inventory information.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined only by the claims which follow:

We claim:

1. An electronic seal comprising:

an electronic tag;

an electrically resistive element in electrical communication with and attached to said tag, wherein tampering with the electrically resistive element causes a change in said electrical resistance, said change in electrical resistance being communicated to said tag, wherein said resistive element comprises a multiplicity of resistive wires, wherein only a random number of said wires are electrically connected to internal connection points in said tag such that said resistive element has a statistically random electrical resistance.

2. A seal according to claim 1 wherein said tag transmits said change in electrical resistance to a transceiver, said transceiver communicating said change to a detection system.

3. A seal according to claim 2 wherein said tag transmits said change to said transceiver by RF transmission.

4. A seal according to claim 1 wherein said resistive element is bonded to said tag with an electrically conductive adhesive having an adhesive strength, said element being bonded to said object with an adhesive strength greater than the adhesive strength of said conductive adhesive.

5. A seal according to claim 1 wherein said tag operates in a sleeping mode and said change in electrical resistance is communicated to said tag only when said tag is activated with a wake-up signal.

6. A seal according to claim 5 wherein a transceiver communicates said wake-up signal to said tag.

7. A seal according to claim 1 and wherein said tag comprises a timer and memory for monitoring time and duration of said change in electrical resistance.

8. A seal according to claim 7 and wherein said memory stores at least one of identification data and asset data.

9. An electronic seal comprising:

an electronic tag;

an electrically resistive element in electrical communication with and attached to said tag, said resistive element being adhesively bondable to an object so as to define an electrical resistance, wherein a change in adhesive bonding of said element to said object causes a change in said electrical resistance, said change in electrical resistance being communicated to said tag, wherein said resistive element is bonded to said tag with an electrically conductive adhesive having an adhesive strength, said element being bonded to said object with an adhesive strength greater than the adhesive strength of said conductive adhesive.

* * * * *